US008682485B2

(12) United States Patent
Anhalt et al.

(10) Patent No.: US 8,682,485 B2
(45) Date of Patent: Mar. 25, 2014

(54) METHODS AND SYSTEMS FOR AN AUTONOMOUS ROBOTIC PLATFORM

(71) Applicant: Science Applications International Coproration, San Diego, CA (US)

(72) Inventors: David Anhalt, Littleton, CO (US); Keith D. Gremban, Highlands Ranch, CO (US)

(73) Assignee: Leidos, Inc., Reston, VA (US)

( * ) Notice: Subject to any disclaimer, the term of this patent is extended or adjusted under 35 U.S.C. 154(b) by 0 days.

(21) Appl. No.: 13/681,506

(22) Filed: Nov. 20, 2012

(65) Prior Publication Data

US 2013/0103195 A1    Apr. 25, 2013

Related U.S. Application Data

(63) Continuation of application No. 11/646,451, filed on Dec. 28, 2006, now Pat. No. 8,346,391.

(51) Int. Cl.
| | |
|---|---|
| *G06N 5/00* | (2006.01) |
| *G05B 13/04* | (2006.01) |
| *G05D 1/02* | (2006.01) |
| *G06F 15/18* | (2006.01) |
| *B25J 5/00* | (2006.01) |

(52) U.S. Cl.
USPC ........... 700/246; 700/248; 700/245; 700/247; 700/258; 901/1; 901/46; 901/50

(58) Field of Classification Search
USPC ............. 700/245–264; 901/1–50; 318/568.12
See application file for complete search history.

(56) References Cited

U.S. PATENT DOCUMENTS

| | | | |
|---|---|---|---|
| 6,427,142 B1 | 7/2002 | Zachary et al. | 706/49 |
| 6,842,877 B2 | 1/2005 | Robarts et al. | 715/708 |
| 7,211,980 B1* | 5/2007 | Bruemmer et al. | 318/587 |
| 7,303,010 B2 | 12/2007 | de Guzman et al. | 166/255.1 |
| 7,305,371 B2 | 12/2007 | Brueckner et al. | 706/45 |
| 7,609,156 B2 | 10/2009 | Mullen | 340/539.13 |
| 7,765,029 B2 | 7/2010 | Fleischer et al. | 700/250 |
| 2004/0007121 A1 | 1/2004 | Graves et al. | 89/1.11 |
| 2005/0216182 A1 | 9/2005 | Hussain et al. | 701/200 |

(Continued)

OTHER PUBLICATIONS

Technology Development for Army Unmanned Ground Vehicles. Washington, DC: The National Academies Press, 2002.*

(Continued)

*Primary Examiner* — Khoi Tran
*Assistant Examiner* — Dale Moyer
(74) *Attorney, Agent, or Firm* — Bey & Cotropia PLLC

(57) ABSTRACT

A system and method can provide a command and control paradigm for integrating robotic assets into human teams. By integrating sensor to detect human interaction, movement, physiology, and location, a net-centric system can permit command of a robotic platform without an OCU. By eliminating the OCU and maintaining the advantages of a robotic platform, a robot can be used in the place of a human without fatigue, being immune to physiological effects, capable of non-humanoid tactics, a longer potential of hours per day on-station, capable of rapid and structured information transfer, has a personality-free response, can operate in contaminated areas, and is line-replaceable with identical responses. A system for controlling a robotic platform can comprise at least one perceiver for collecting information from a human or the environment; a reasoner for processing the information from the at least one perceiver and providing a directive; and at least one behavior for executing the directive of the reasoner.

20 Claims, 16 Drawing Sheets

(56) References Cited

U.S. PATENT DOCUMENTS

| | | | |
|---|---|---|---|
| 2005/0222810 A1 | 10/2005 | Buford et al. | 702/183 |
| 2005/0288819 A1 | 12/2005 | de Guzman | 700/245 |
| 2006/0053534 A1 | 3/2006 | Mullen | 2/456 |
| 2007/0197877 A1 | 8/2007 | Decorte et al. | 600/300 |
| 2007/0230269 A1 | 10/2007 | Ledeczi et al. | 367/117 |
| 2007/0239314 A1 | 10/2007 | Kuvich | 700/245 |
| 2008/0009970 A1* | 1/2008 | Bruemmer | 700/245 |
| 2008/0253613 A1 | 10/2008 | Jones et al. | 382/103 |
| 2009/0066641 A1 | 3/2009 | Mahajan et al. | 345/156 |
| 2009/0073034 A1 | 3/2009 | Lin | 342/357.07 |
| 2009/0125225 A1 | 5/2009 | Hussain et al. | 701/200 |
| 2009/0180668 A1 | 7/2009 | Jones et al. | 382/103 |
| 2009/0265106 A1 | 10/2009 | Bearman et al. | 701/300 |
| 2009/0320585 A1 | 12/2009 | Cohen | 73/167 |
| 2011/0030537 A1 | 2/2011 | Mullen | 89/1.11 |

OTHER PUBLICATIONS

Technology Development for Army Unmanned Ground Vehicles. Washington DC: The National Academies Press, 2002. (Front matter, 32 pages).*

Timofeev, A. V., Kolushev, F. A., Bogdanov, A. A., "Hybrid Algorithms of Multi-Agent Control of Mobile Robots," Neural Networks, 1999, IJCNN '99, International Joint Conference on Neural Networks, vol. 6, pp. 4115-4118, Jul. 1999.

* cited by examiner

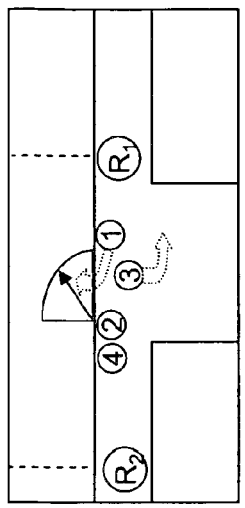
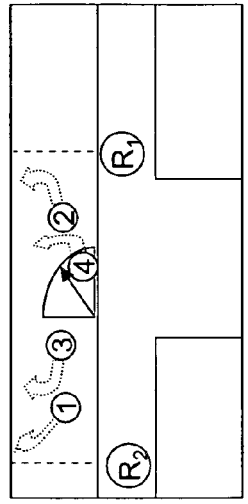
FIG. 14c
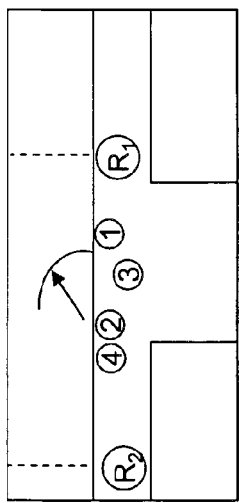
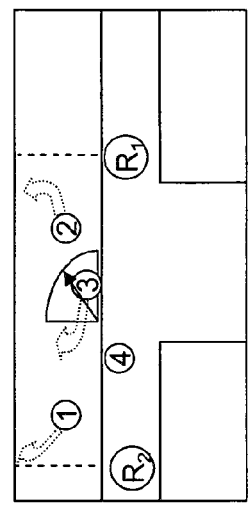
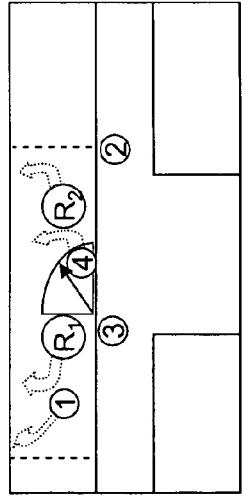
FIG. 14f
FIG. 14b
FIG. 14e
FIG. 14g
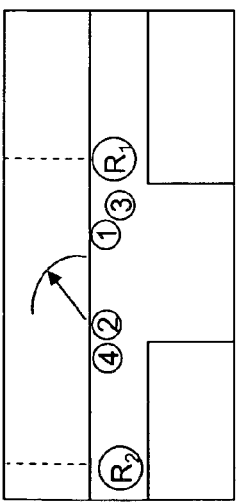
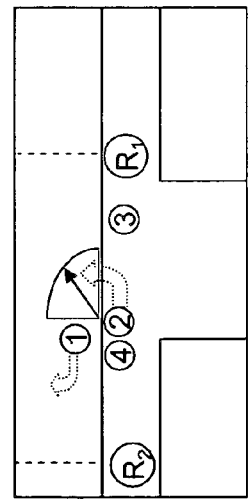
FIG. 14a
FIG. 14d

METHODS AND SYSTEMS FOR AN AUTONOMOUS ROBOTIC PLATFORM

CROSS-REFERENCE TO RELATED APPLICATIONS

This application is a continuation of U.S. patent application Ser. No. 11/646,451, filed Dec. 28, 2006, entitled "METHODS AND SYSTEMS FOR AN AUTONOMOUS ROBOTIC PLATFORM," which is incorporated herein by reference in its entirety.

BACKGROUND OF THE INVENTION

1. Field of the Invention

The field of the invention relates to the command and control of robotic platforms.

2. Description of the Related Art

Conventional approaches to command and control ("C2") of mobile robotic platforms, including unmanned ground, sea, or air vehicles, typically require constant human interaction or intervention. Generally, the current state of robotic C2 relies on either remote control, teleoperation, or map-based semi-autonomy.

Remote control is conventionally implemented by having a remote operator directly control the robot. Typically, any and all actions executed by the robot are directly controlled by the operator, who is assumed to be in line-of-sight to the robot. The operator watches the robot and controls it through an operator control unit ("OCU"). The OCU is a remote device that can be tethered to the remote platform, but typically is not. The OCU typically has a joystick or other steering controller to control the movement and/or operation of the remote platform. The human operator must visually follow the unmanned vehicle to determine the next course of action and command the unmanned vehicle through the OCU to conduct that course of action. This operation is similar to operation of a remote-control toy car, where operation can be subject to visibility and distance limitations.

In conventional teleoperation of a robotic platform, the OCU typically includes a video display and joystick for a human operator to control the robotic platform. Teleoperation is similar to remote control, but the line-of-sight restriction can be removed by utilizing sensors such as cameras (e.g., a camera on the vehicle viewed through a video display in the OCU) that give the operator a sense of the robot's environment and actions. An operator watches sensor output from the robot and controls the robot's actions with a joystick. In one example, the OCU can have a video display to monitor the actions of the robotic platform and/or the environment. The human operator uses the joystick on the OCU to operate the robot, making observations through the video display.

In conventional semi-autonomous control of a robotic platform, the robot follows a sequence of GPS waypoints using sensors on board the robotic platform to detect and avoid any obstacles it may encounter. Using a conventional map-based OCU, robots are controlled by entering sequences of waypoints and tasks through the OCU. The robot then moves through the waypoints, carries out the tasks autonomously, and requires retasking upon completion or upon encountering circumstances that prohibit completion. For example, a human operator, based on location and limited information regarding the surroundings, designates waypoints on a map or overhead imagery, thereby commanding the robot to travel from a first coordinate to a second coordinate and so on to successive waypoints. The robot can be commanded to perform designated tasks at each waypoint, or along each path between waypoints.

SUMMARY OF THE INVENTION

Summary of the Problem

There are a number of problems associated with conventional operator control of robotic platforms. Remote control of a robot is typically low-cost, but can only be operated in line-of-sight, and full-time operator attention is required. Additionally, although entities can be tracked with sensors and viewed by a human operator, this conventional method fails when an entity goes around a corner and cannot be tracked. Similarly, teleoperation of a robotic platform is also low-cost and full-time operator attention is also required, although teleoperation is not limited to line-of-sight control. The conventional, semi-autonomous map-based system is slow, requires training, is difficult to use to re-plan, and requires a sophisticated OCU, which is often heavy and cumbersome. Additionally, if there is an unforeseen event or circumstance, such as an obstacle or other situation that cannot be handled by its on-board programming, the robotic platform may require human intervention. These conventional systems can require significant and overt human direction of robot actions. As a result, these methods can break down when human operators are stressed or otherwise distracted.

To make robots effective in supporting human teams, the human operator must not only visualize the location of the unmanned vehicle, but also understand the surrounding circumstances or environment. For example, referring to FIGS. 1a and 1b, two aerial views of squads in urban situations are illustrated showing soldier locations and the location of an unmanned vehicle. As shown in this example, it can be difficult for a remote operator to determine if the squad is in danger and the location of the threat. If the operator of the unmanned vehicle can only observe the squad via the aerial view of locations illustrated in FIG. 1b, the remote operator may not be able to discern whether the squad is taking a break or taking cover from enemy fire. Without understanding the situation, the remote operator may be unable to command the robot appropriately.

If the operator is local, the stress of the situation can make it difficult for the operator to command the robot. For example, as shown in FIG. 1a, a squad of soldiers 100 can be moving down a street in an urban area with an unmanned vehicle carrying spare ammunition and supplies. In order to control the unmanned vehicle, a human operator with the squad or a remote operator through limited visibility must explicitly task the vehicle 120. In the instance a sniper takes a shot at the squad or an IED explodes near the squad, the soldiers 100 may take cover behind a building or structure 110, as shown in FIG. 1b. The unmanned vehicle 120 does not react appropriately and follow the soldiers because the human operator, who is concerned with his or her own life, takes cover rather than using an OCU to command the unmanned vehicle 120 to follow. As a result, the unmanned vehicle 120 may continue to follow its original route and traverse the street away from the squad.

The use of unmanned vehicles or other robotic platforms in military operations can extend a team's area of influence, broaden its situational awareness and understanding, and increase its lethality and survivability, while reducing the physical and cognitive burden on individual team members. However, current unmanned vehicles can require near-constant human supervision and are difficult to retask when events change. As a result, unmanned vehicles are typically been relegated to operations that can be done slowly and deliberately, such as explosive ordinance disposal.

Adding a second unmanned vehicle to a team can require additional equipment, and require a second team member to operate the OCU for that unmanned vehicle. As a result, the team can have one less soldier, rescue worker, or other type of team member for accomplishing a goal.

Controlling an unmanned vehicle through an OCU can be cognitively demanding. In fact, many potential military applications for robots are considered unworkable because of the OCU requirement. As a result, unmanned vehicles may be excluded from high-intensity situations, including those in which the unmanned vehicles can be the most useful to the team.

Summary of the Solution

One solution to these problems can be to enable asymmetric cognitive teams ("ACT"). For example, an ACT can be created by augmenting a mobile robot's sensors with instrumentation of other members of the team, and using this information in a cognitive model to enable the robot to understand the immediate situation and select appropriate behaviors. A robot so equipped would be able to "do the right thing" automatically, thereby eliminating the need for cumbersome OCUs; the robot literally acts like a member of the team, automatically adapting its actions to complement those of the other team members. The solution can reduce the cognitive burden on an operator by providing natural (i.e., human-like) interaction. In the example shown in FIGS. 1a and 1b, if the squad of soldiers move to a wall, an ACT-enabled robot can utilize the information about the change in formation along with data such as heart rate, blood pressure, and weapon status to determine whether the soldiers are in a combat situation or are taking a break. The robot can then automatically take the appropriate action, such as providing cover in the case of a combat situation or offering resupply if the team is taking a break. The system can enable robotic entities or unmanned vehicles to operate as effective team members without the need for constant human direction. As a result, each human team member can act according to his/her training, rather than requiring a team member to use an OCU to control a robot.

The exemplary embodiments described herein can provide a command and control paradigm for integrating robotic assets into human teams. By integrating sensors to detect human movement, physiology, and location, and incorporating a cognitive model of situations and behaviors, an ACT can permit command of a robotic platform without an OCU. By eliminating the OCU and maintaining the advantages of a robotic platform, a robot can be used in the place of a human without fatigue, being immune to physiological effects, capable of non-humanoid tactics, a potential of about 24 hours per day on-station, capable of rapid and structured information transfer, has a personality-free response, can operate in contaminated areas, and is line-replaceable with identical responses.

In one embodiment, a system for controlling a robotic platform comprises at least one instrumented external entity, at least one sensor on each team member, one perceiver for collecting information from the at least one instrumented external entity; a reasoner for processing the information from the at least one perceiver and providing a directive; and at least one behavior for executing the directive of the reasoner.

In another embodiment, a method for controlling a robotic platform comprises the steps of developing tactical behaviors; determining a mission, situation, disposition, and/or human cognitive or emotional state; driving a cognitive model; inferring current state, goals, and intentions; and selecting an appropriate behavior.

In yet another embodiment, a system for controlling a robotic platform comprises a team sensor system; a software system comprising a perception component for providing information from the sensors; a cognition component for estimate an intent from that information; a playbook action generator component for determining a course of action; a playbook executor component for executing the course of action complementary to the estimated intent; and an unmanned vehicle interface.

In still yet another embodiment, a system for controlling a robotic platform comprises at least one sensor that detects a status; a software component that receives the status from the sensor; and the software component comprising a cognitive model; wherein the cognitive model directs the robot to perform an action.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The present invention will be more clearly understood from a reading of the following description in conjunction with the accompanying exemplary figures wherein:

FIGS. 14a to 14g show a team's ingress on a location according to an embodiment of the present invention.

DETAILED DESCRIPTION

Reference will now be made in detail to the preferred embodiments of the present invention, examples of which are illustrated in the accompanying drawings.

The systems and methods described herein can enable robotic platforms to perform appropriate behavior without overt human control. Control of robot platforms occurs without bulky and expensive OCUs. Robots can learn tactics and appropriate behavior from humans. Robots can continue to operate when all humans are distracted or cognitively overloaded. Robots can learn from training (much like humans do), and robots can fully interact with and support human teams. As compared to conventional systems that typically control an unmanned or robotic vehicle through an OCU, the systems and methods described herein can observe a human and/or team behavior and decide appropriate actions without direct tasking from humans. By understanding an individual's or a team's reaction to a situation, rather than understanding the entire environment and situation, the system can command the robot accordingly. Information can be provided about the human or the team by using sensors. A cognitive model on the unmanned vehicles can process the information, determine the appropriate action based on models of human activities, and then execute the action and monitor the result. In one exemplary action, the unmanned vehicle can move with the team as the team moves. If the team halts, the unmanned vehicles know to halt. If the team assumes a tactical formation, the unmanned vehicles know to move to and maintain an appropriate position in the formation.

The architecture of the system uses hardware and software, as well as information flow to produce an approach to robotic command and control. The systems and methods can utilize net-centric information flow and an embedded cognitive model to build a working model of the current situation and a human's or team's intent. The humans and robotic platforms can interact through a communications network. Net-centric resources include sensors or instrumentation of humans and teams. The robotic platform then generates a short-term course of action for the robotic platform to pursue, without overt human control or direction by OCUs. Eliminating an OCU and/or direct control (e.g., RF control) can enable robots to be useful without physically or cognitively burdening human team members. This approach can also reduce training required for robotic platform control and can enable learning of tactics by the robotic platform. As a result, the robotic platforms can become useful members of human teams, while reducing the attention and effort on the part of the humans to direct the robotic platforms. One potential advantage can be to enable robotic platforms to be useful when humans are under stress or otherwise distracted.

Figure 1B:
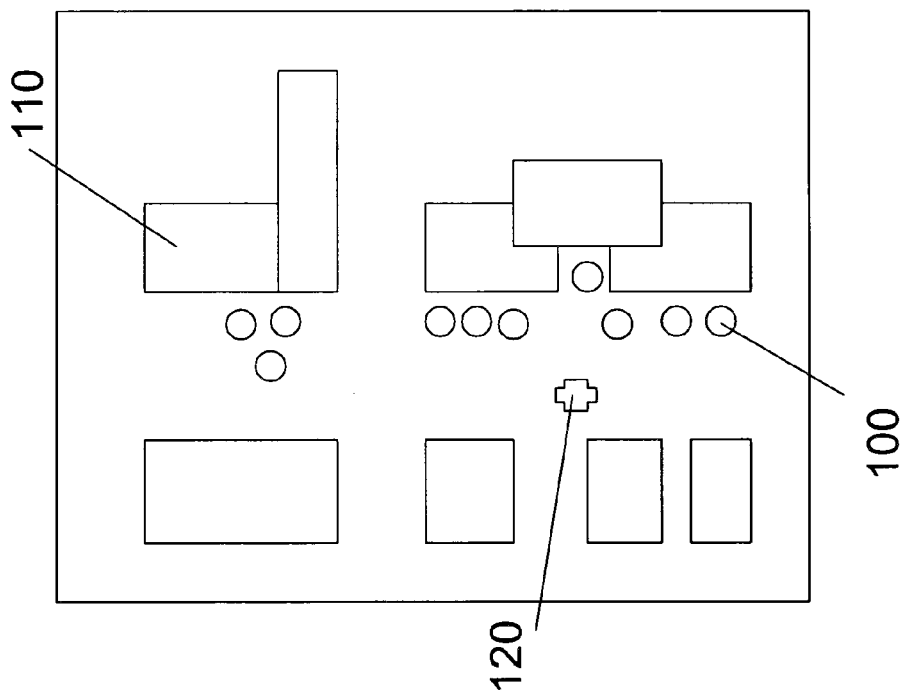
FIGS. 1a and 1b show an aerial view of the location of the members in a squad.
Figure 1A:
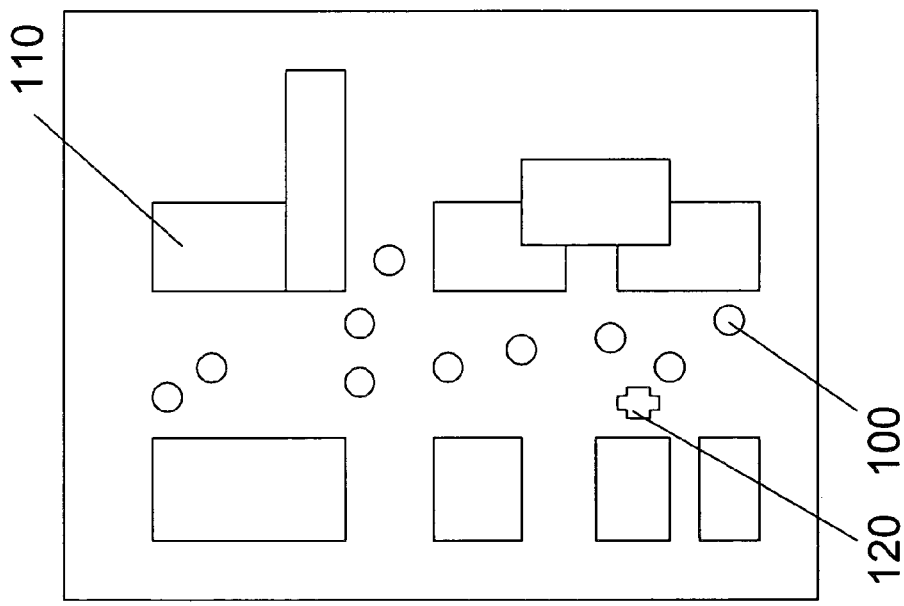
Figure 2:
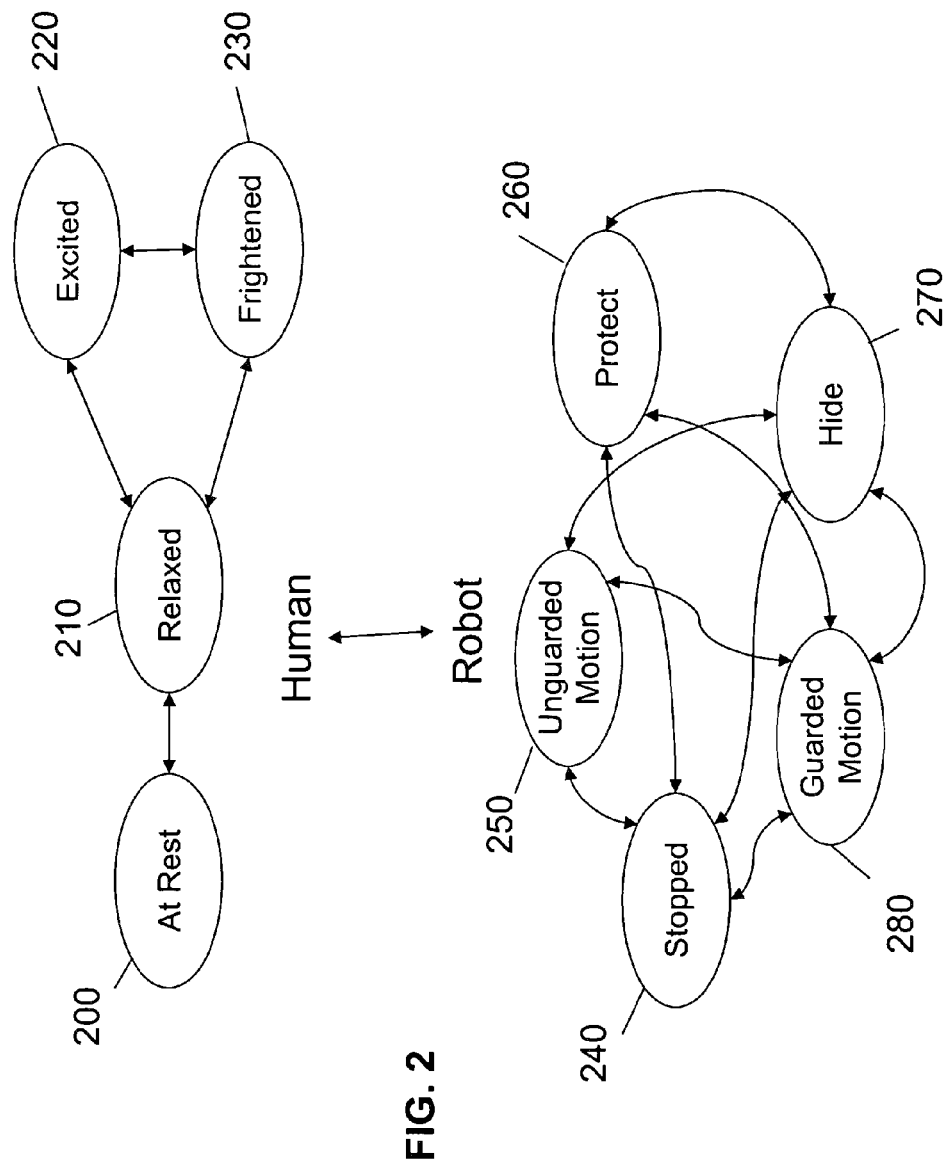
FIG. 2 shows states of a human and a robot according to an embodiment of the present invention.

Referring to FIG. 2, coordination between a human and a robot can assist in replacing the burden of explicit control by a human. Coordination can be possible through mutual monitoring and mutual understanding. The system builds a cognitive state model of the human and uses it to determine an appropriate course of action. The human transitions between cognitive states, which can include, but are not limited to, at rest 200, relaxed 210, excited 220, and frightened 230. The system can make inferences based on known or detectable information, such as the mission, situational awareness and understanding, squad dynamics, posture, physiology, and logistics state. These inferences trigger a transition in the robot's behavioral state, which can include, but are not limited to, stopped 240, unguarded motion 250, protect 260, hide 270, and guarded motion 280.

The systems and methods described herein can integrate and control multiple unmanned platforms (i.e., mobile robots or vehicles) into human teams. The unmanned platforms can be interchangeably referred to herein as a robot, robotic platform, or unmanned vehicle. The systems and methods can be applied to any ACT-enabled platform including but not limited to ground, air, water surface, and underwater robotic platforms, which are also referred to herein as unmanned vehicles, including unmanned ground vehicles, unmanned aerial vehicles, unmanned surface vehicles, unmanned subsurface vehicles, or any other type of unmanned vehicle known in the art. The unmanned vehicle is not intended to be limited to only those vehicles that cannot be manned and includes all ground, air, sea, and undersea vehicles that can operate in an unmanned mode. Additionally, the unmanned mode of the unmanned vehicle is not intended to be limited to only when a human is not present on, in, or near the vehicle.

The systems and methods can be domain-independent. For example, the robotic platform can be a supply carrier for a dismounted warfighter. In another example, the robotic platform can be a tank ammunition carrier that can move into position to provide ammunition. In yet another example, the robotic platform can be a surveillance air vehicle drone that stays in position over the battlefield to give situational awareness. The platform can also be a sensor platform and/or a weapons and/or a logistics platform.

Although a soldier or a team member is described herein as a human, a soldier or team member can also include non-human members such as trained animals, robotic platforms, or other vehicles and equipment. In certain configurations, the human being is an individual soldier. In other configurations, the human is a member of a team. The soldier or team member is not intended to be limited to only those configurations where a human acts with other human beings. Additionally, the soldier or team member is not intended to be limited to a human conducting a military operation.

A team or squad is not intended to be limited to a plurality of humans conducting a military operation. A team can include at least two team members, equipment, vehicles, or other entities that function together for a common purpose.

The systems and methods can be used in any applications including, but not limited to, where tightly integrated, real-time cooperation between humans and robots can be required, such as warfare (e.g., support for dismounted infantry or mounted operations), control of non-combatants (e.g., crowd control, peacekeeping patrols), and high-intensity, time-critical operations (e.g., search and rescue after man-made or natural disasters). Additional opportunities for the systems and methods can include tactical military applications, such as a robotic point man, robotic logistics platform, force protection sentries, and similar applications. Other applications can include any application in which a robot can complement or augment human capabilities, such as a construction assistant. Additional opportunities can include site security and patrolling, human/robot First Responder teams, and any other situation where humans can be augmented by mobile robots. Additional military applications can include vehicles used in ground and sea convoys and swarming type attack vehicles (e.g., small boats, ATVs, and Navy Seal activity). Non-military applications can include ground and air vehicles for border patrols and harbor/facility/critical infrastructure patrol vehicles.

Figure 3:
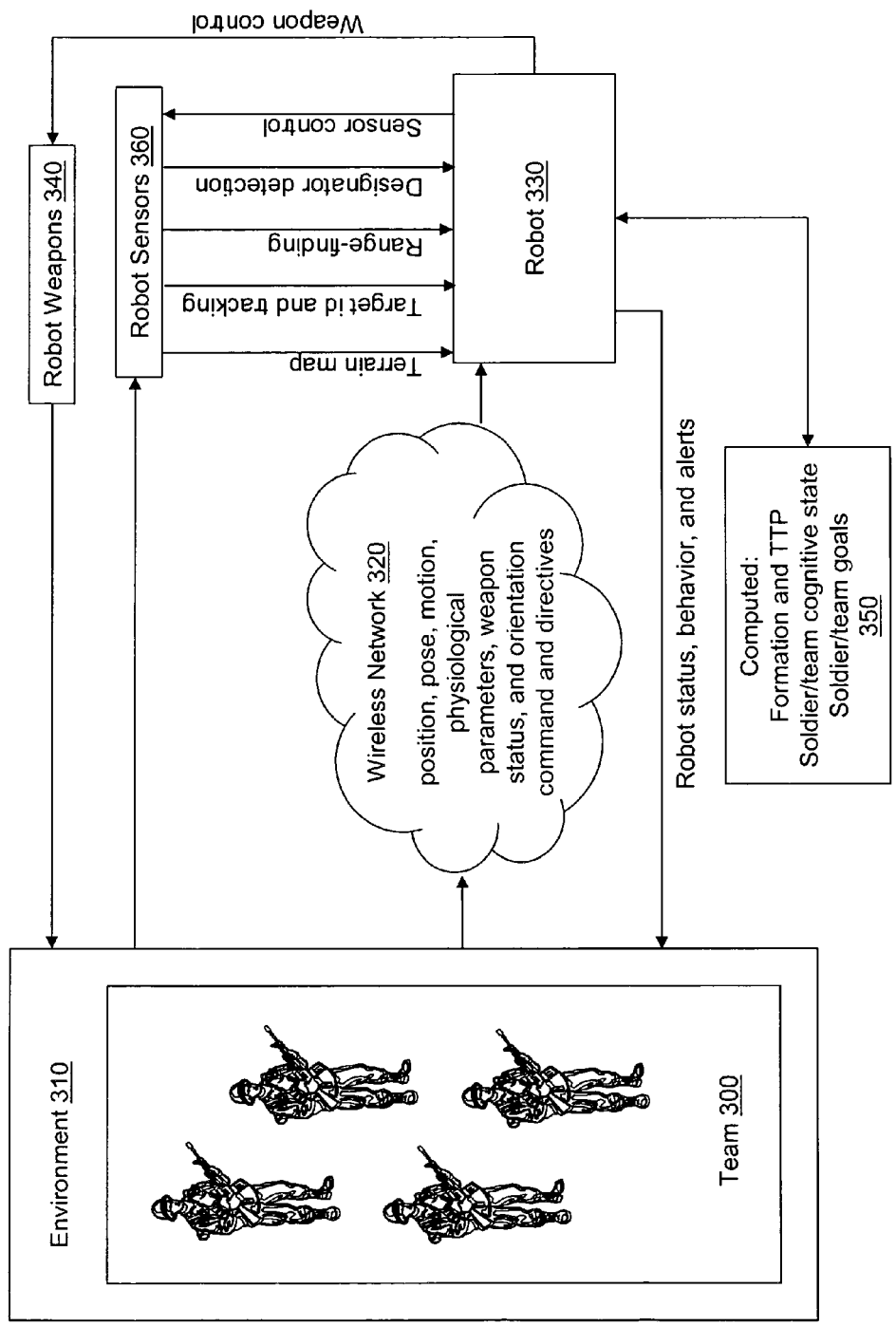
FIG. 3 shows a communication network between a team and a robot according to an embodiment of the present invention.

As shown in FIG. 3, a team of soldiers 300 in an environment 310 can communicate with each other and a robot 330 through a wireless network 320. Such communications can include position, pose, motion, physiological parameters, weapon status, and orientation command and directives. Additionally, robot sensors 360 can detect the environment 310 and the team 300 and report to the robot 330 with information including but not limited to a terrain map, target identification and tracking, range-finding, and designator detection. The robot 330 can control the robot sensors 360 and the robot weapons 340. The status, behavior, and alerts of the robot 330 can be communicated to the team 300. The robot 330 can compute formation, tactics, techniques, and procedures, as well as soldier or team cognitive state and goals.

Improving human-robot coordination can be useful in replacing the burden of explicit control, such as through an OCU. Coordination can be possible through mutual monitoring and mutual understanding. The systems and methods herein can build a cognitive state model of the team member or team and can use it to determine the appropriate course of action. The system can use team location, physiology, and weapons status to estimate individual or team cognitive state and goals. That estimate can then be used with triggering events to transition the robotic state model. The robot then can execute tactically appropriate behaviors in response to the state of the individual or team. For example, the robot halts when the individual or team is relaxed. As another example, when the individual or team is frightened, the robot can maneuver between the team and an inferred threat.

As compared to conventional systems, the systems and methods described herein can focus on situationally appropriate behaviors, rather than rote execution of predefined plans. For example, the system can use information from the humans in the form of location, looking and pointing directions, physiological data, and other information sources that may be available (e.g., machine readable high-level plans and situational information). This information is fed to a cognitive model that develops a model of each human in the team as well as the team as a whole in order to estimate the actions and intent of the humans. Once the robotic platform can estimate the intent, the system can then use that estimate of intent to define its own course of action. For instance, if a team of humans is moving through a town in a line formation, the robot will automatically get in line (either at the end or filling a gap) and move with the team—starting, stopping and changing speed with the team.

Figure 4:
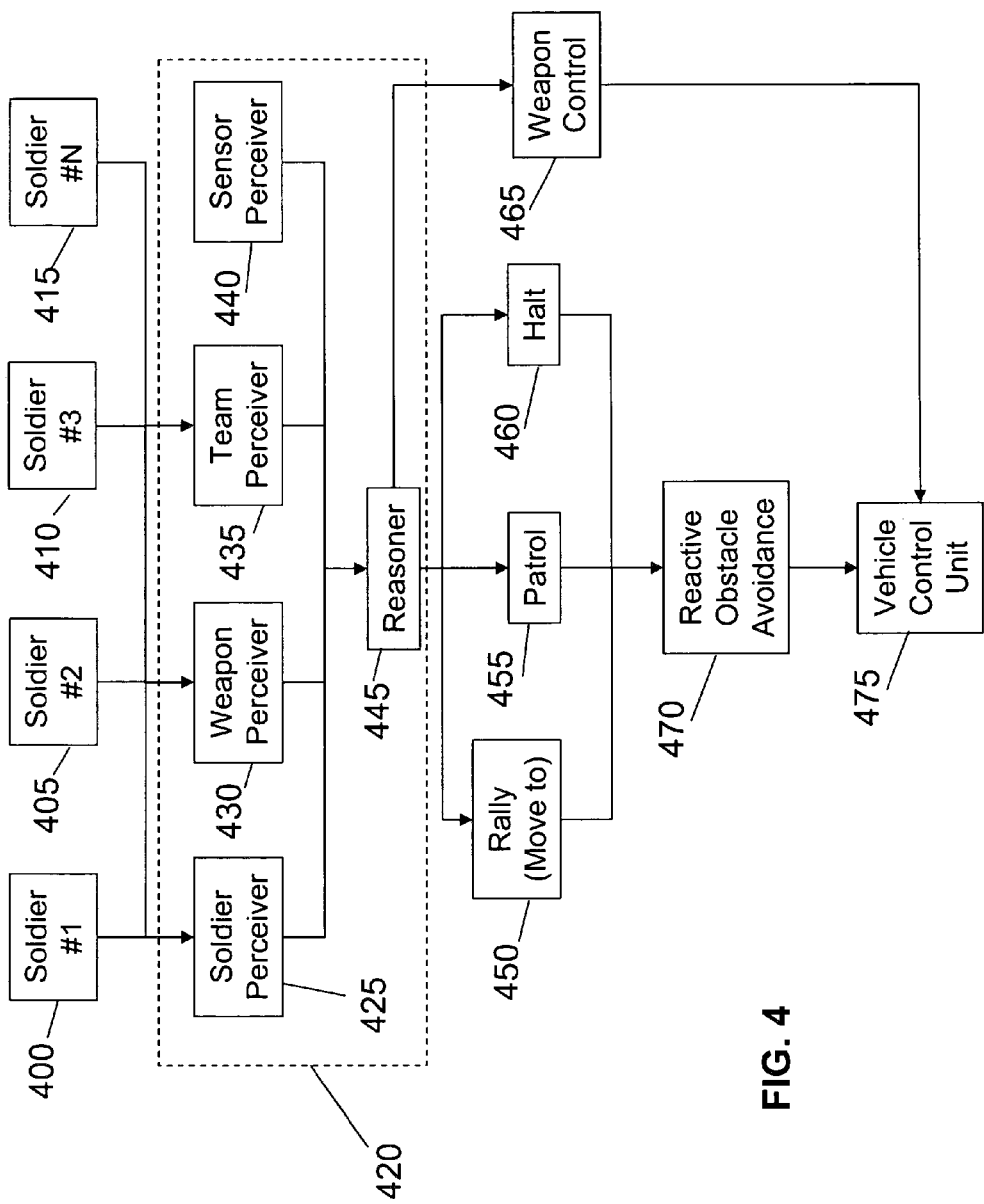
FIG. 4 shows a system architecture according to an embodiment of the present invention.

Generally, the systems and methods can operate as follows. Referring to FIG. 4, a cognitive model 420 has at least one perceiver 425, 430, 435, 440 and a reasoner 445. The perceivers can include, but are not limited to, a soldier perceiver 425, weapon perceiver 430, team perceiver 435, and sensor perceiver 440. The perceivers 425, 430, 435, 440 can be a software and/or a hardware component configured to produce tactical information with confidence metrics that drives the cognitive model 420 to estimate the current tactical state and condition of the team. For example, each perceiver 425, 430, 435, 440 can answer tactical questions about the current situation, such as: are the team members excited, are their weapons safe, are the majority of weapons pointed in the same direction, is anyone in a tactical pose? Information from soldiers 400, 405, 410, 415 can be communicated to the soldier perceiver 425, the weapons perceiver 430, and the team perceiver 435. The perceivers can characterize the team member's state, such as location, posture, physiology, weapon status having the safety on/off, weapon pointing, and trigger pulls. The soldier perceiver 425 queries, for example, whether the soldiers are on alert or whether the soldiers are running or hiding. The weapon perceiver 430 queries, for example, whether the safety is in an "off" position, the weapon is low on ammunition, or if the weapon is pointing at a threat. The team perceiver 435 queries, for example, whether the team is in a formation and which formation, whether the formation is spreading or shrinking, whether the formation is changing, or where should the robot be in the formation. A sensor on a human or a robotic platform can be included in the perceiver or, alternatively, the sensor can be a separate component that provides information to the perceiver. The perceivers combine messages and sensor information from the sensors through the wireless communication system to the reasoner 445 to answer tactical questions.

The reasoner 445 can consider trigger events, confidences, and soldier/squad state to determine appropriate action. The reasoner 445 can be a software and/or a hardware component configured to query the perceivers 400, 405, 410, 415 and uses the information to determine the situation. For example, the reasoner 445 can query the perceivers 400, 405, 410, 415 based on trigger events and state matching, including, for example, increase in heart rate and blood pressure, safeties in an "off" position, trigger pulls, or postures changing to cover postures. Alternatively, the reasoner 445 can respond to a verbal override. Based on the results, the reasoner 445 constructs a tactical picture.

A plurality of behaviors can be used to execute the reasoner's 445 directives to perform tactical actions. Behaviors include, but are not limited to, rally 450 (e.g., move to a coordinate), patrol 455 (e.g., move in a pattern to follow a soldier or other robot), halt 460 (e.g., hold position), and weapon 465 (e.g., aiming and firing of a weapon). Examples of rally behaviors include the robot rally on a soldier, rally to a named waypoint, or rally to a designated position. Examples of patrol behaviors include point, follow soldier, formation move, patrol, and guard. Examples of weapon behaviors include cover fire, suppression fire, sector-free fire, and IFF protection. IFF is identification friend or foe and is a procedure to identify friendly entities. Behaviors are communicated to a reactive obstacle avoidance system 470, which identifies any obstacles and commands the unmanned vehicle to go around them, and a weapon control 465, which communicates with a vehicle control unit 475.

Generally, the system architecture can use on-board sensors to validate and localize information received from the team and to capture information that is not available net-centrically. Periodically or in real-time, the system can be provided with each team member's location, weapon state, and physiological state. In some configurations, the system can utilize the team member's reaction to events, which can be easier to understand than the events themselves. The cognition component fuses all incoming information into a tactical picture and develops an estimate of squad intent. The cognitive model consumes the perception estimate of higher-order team member behavior, which are observable states that indicate the internal state of the team member. This tactical state estimate enables the generation of an action in view of the current intent and short-term goals of the team members.

Figure 5:
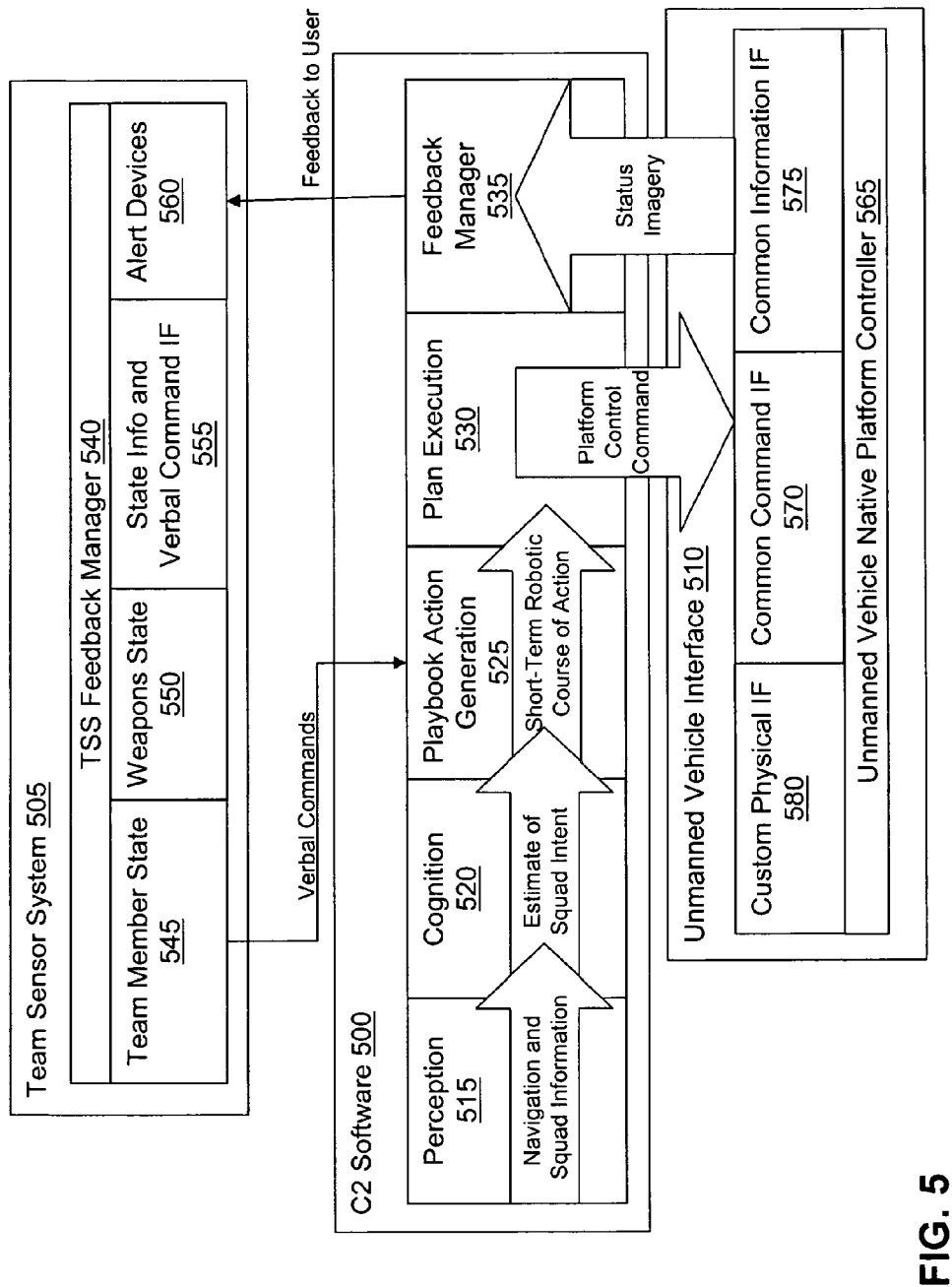
FIG. 5 shows a system architecture according to an embodiment of the present invention.
Figure 6:
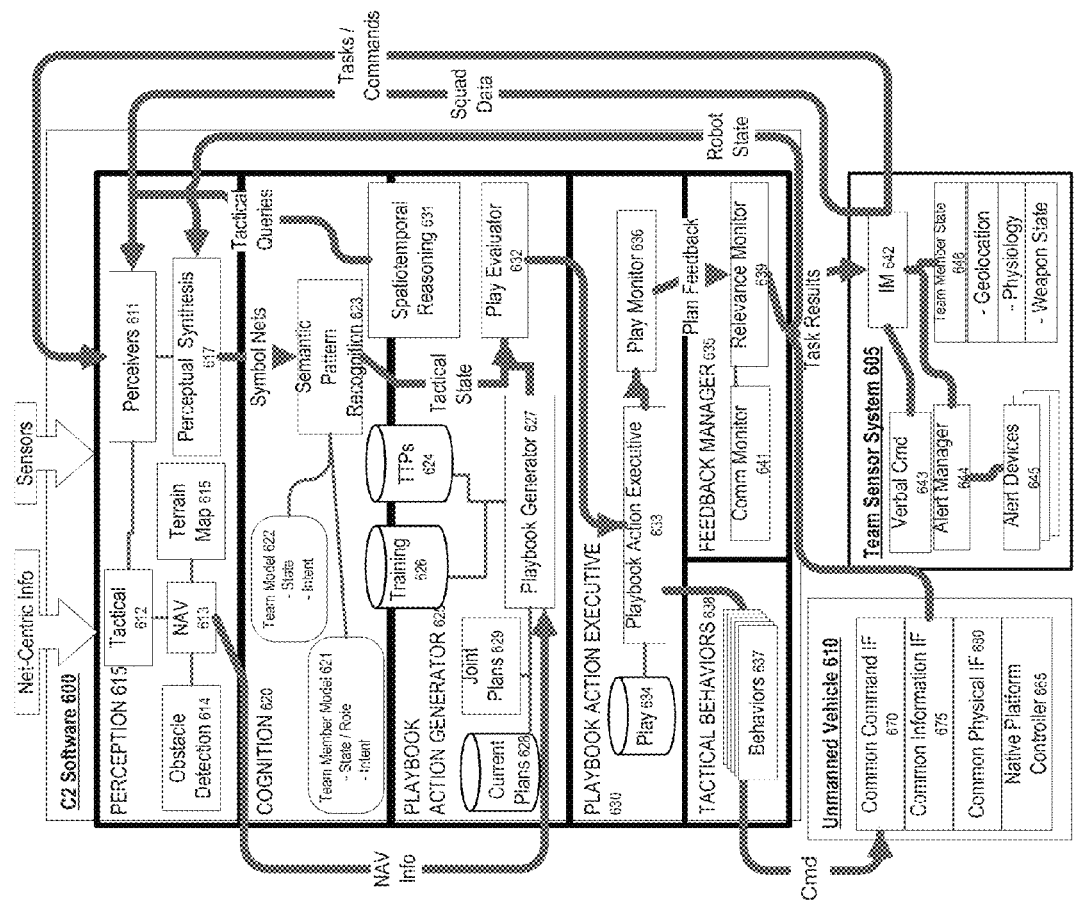
FIG. 6 shows a system architecture according to an embodiment of the present invention.

With regards to the system architecture, referring to FIGS. 5 and 6, a system has C2 software 500, 600 a team sensor system ("TSS") 505, 605 and an unmanned vehicle interface or integration kit 510, 610. The system uses a cognitive framework, fuses perception and net-centric information from the TSS 505, 605 and other sources into a cohesive estimate of squad intent, generates a short-term robotic plan, then uses tactical behaviors to execute the plan.

The C2 software 500, 600 provides functionality for perception, cognition, playbook action selection, executing and monitoring, and an interface to the unmanned platform. The C2 software 500 can support at least one unmanned vehicle that can, for example, maneuver with a team, execute behavioral roles, carry supplies, or resupply team members. The C2 software 500 can also enable unmanned vehicles to support coordinated team tactical maneuvering, behavioral roles for sensor coverage, and protection for weapon coverage. The C2 software 500 can provide network information management and dissemination functionality to enable efficient communications between the TSS 505 and the unmanned vehicles.

The C2 software 500, 600 includes perception software 515, 615, cognition software 520, 620, playbook action-generation software 525, 625, playbook action (or plan) execution 530, 630, and playbook action feedback 535, 636. Perception software 515, 615 can provide functionality to sense and analyze the environment for navigational and tactical purposes, such as obstacle detection, local terrain mapping, and tactical perception and symbolization (i.e., representation of the perceived entities in terms useful to the cognitive processing and action generation functions). The perception software 515, 615 uses net-centric information, as well as information from sensors. Perceivers 611, such as those described above with respect to FIG. 4, can operate with a tactical module 612, which can navigate 613 by using obstacle detection 614 and a terrain map 616.

Cognitive model software 520, 620 can provide the functionality to identify the current tactical state of team members, the team's tactical state as a whole, and the ability to share information between multiple cognitive models. The cognitive model 520, 620 can interact with other parts of the system to direct sensing and perceiving resources to help disambiguate the existing tactical situation. The cognitive model 520, 620 learns at different levels based on feedback from team members and chunking, or other short-term memory, to support human-based cues that identify when the system should learn a new situation. Cognitive software 520, 620 can identify the state/role of a team member 621 or a team 622 using semantic pattern recognition 623, which obtains information from the perceptual synthesis 617 of the perceivers 611. Semantic pattern recognition 623 can use patterns in memory to recognize an environment and can look for further patterns or clues to further distinguish the type of environment.

Robotic playbook action-generation software 525, 625 can provide the functionality to generate robotic actions based on the perceived state of the team. The playbook action-generator 525, 625 can use the output of cognitive models to process tactical state information, draw upon stored databases of tactics, techniques, and procedures ("TTP") 624, training materials 626, and act to identify appropriate tactical actions for unmanned vehicles. Along with training 626 and TTPs 624, the playbook generator 627 can use current plans 628, joint plans 629, and information from the navigation module 613 of the perception software 515, 615. This information, along with the tactical state discerned from the semantic pattern recognition 623, can be provided to a play evaluator 632. The system uses spatiotemporal reasoning 631 to understand a situation (e.g., a formation) in a time and space analysis and tries to figure out what the team members are doing and why. Spatiotemporal reasoning 631 submits tactical queries to the perceivers 611.

Playbook action execution software 530, 630 and feedback software 535, 635 can provide the functionality to control and sequence the execution of short-term robotic actions, monitor their execution, identify action failures, and identify when squads have abandoned, replaced, or modified behaviors. The play evaluator communicates with a plan or playbook action executor 633, which also receives information from a play module 634, to communicate with both a play monitor 636 and a plurality of behaviors 637 in the tactical behaviors module 538. The feedback manager 535, 635 evaluates plan feedback in a relevance monitor 639 and communication monitor 641.

The C2 software 500, 600 uses TSS data and other information to estimate the squad intent and generate a plan. The TSS 505 can include non-intrusive sensor devices that provide information to the C2 software 500 and allows for feedback to the user. A TSS Feedback Manager 540 can manage a team member state 545, weapon state 550, state information and verbal command interface 555, and alert devices 560. The TSS feedback manager 540 can control the output (i.e., can decide to send information) from the sensors to the network when there is a change in a sensor's status. The TSS feedback manager 540 can monitor the status of the sensors and send information when there is a change that it deems to be significant.

The team member can use verbal commands to inform the playbook action generator of the team member's state. The TSS 505 can include components and devices for team members to wear or carry that can provide sensor information to the system, as well as provide feedback from the system to the team member. The information can indicate team member location, physiological state, and weapon status information. The components can include, but are not limited to, COTS products such as sensors, worn or carried by the team members, that can provide weapon status information, location (e.g., via global positioning system ("GPS")), a verbal command interface, and/or information on each team member's physiological state. GPS is global positioning satellite, a satellite navigation system that allows accurate determination of a location. Any discussion of GPS is not intended to be limited only to the global positioning satellite, but can include any position locating or tracking system, including, for example, global navigation satellite system ("GLONASS") and Galileo.

Figure 7:
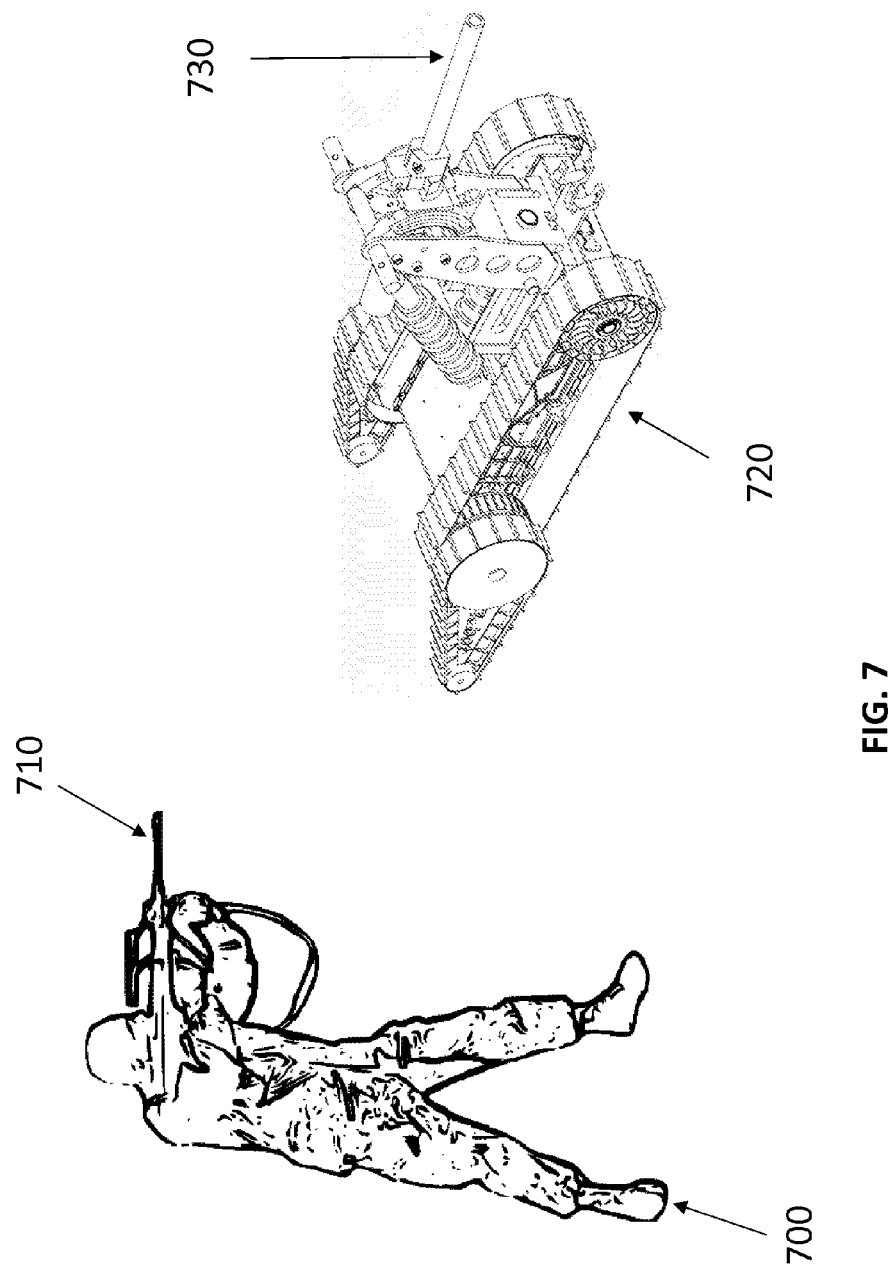
FIG. 7 shows components of a cooperative robotic weapon control system according to an embodiment of the present invention.

There can be numerous embodiments for the TSS components. For example, the TSS 505 can be a modification and/or addition to a rifleman's suite, which disseminates information over a wireless network. Haptics can serve as soundless, non-intrusive alert devices. A GPS chipset integrated into a microcontroller box and interfacing with a team member's personal role radio provides digital communications and team member location reporting. A small box with an inertial sensor (e.g., an orienting device) mounted on the weapon can provide weapon pointing information. The soldier's weapon can also be instrumented with safety, trigger, and auxiliary switches, as well as a laser rangefinder or designator. A chest-strap or instrumented t-shirt can provide physiological responses to a tactical situation, fatigue estimation, and estimates of cognitive load. A laser pointer (e.g., a IZLID 1000P laser pointer) mounted on the weapon can be used as a pointing device to select an object of interest (e.g., a possible IED). A non-intrusive "watch fob" display device can display status and imagery. It can be carried on the team member's belt and glanced at for situational awareness and understanding. A minor change to a team member's weapon can provide trigger-pull and safety status to the system. Solid state accelerometers at joints (e.g., back, thigh, ankle, knee, or hip) of the team members can enable deduction of posture, pose, position, or gait. A team member can wear a vest or bodysuit that has strain gauges or sensors to detect heart rate, respiration, and perspiration. The team member's canteen can also have a sensor to monitor the amount of water or fluids consumed from the canteen. The soldier's weapon can be instrumented for cooperative robotic weapon control. For example, as shown in FIG. 7, when a soldier 700 points and/or fires his weapon 710 in a certain direction, a robotic platform 720 can point a weapon 730 in a substantially similar direction. The robot's weapon 730 can be a surrogate automatic or semi-automatic weapon that can be mounted on a pan-tilt unit. Equipment for TSS may require the team member to carry extra weight, but eliminates bulky OCU equipment.

The TSS 505, 605 receives task results at an information manager 642, which transmits information to a verbal command module 643 and an alert manager 644, which in turn communicates with alert devices 645. The information manager 642 manages the network, captures messages, and decides which messages to listen to and which messages to send. For example, the information manager 642 can decide whether to send a message to a group or to one person and the best way of sending the message. The information manager 642 also identifies the team member's state 646, such as geolocation, physiology, and weapon state. The information manager 642 communicates the team data and tasks or commands to the perceivers 611.

User feedback devices can enable alerts and information transfer back to team members without distracting the team member or obstructing his or her senses. User feedback management software can provide user feedback and manages the information flow to the team members, taking into account available bandwidth, information criticality, the tactical situation, and the estimated cognitive burden.

Unmanned platform interface software 510, 610 can provide the functionality to provide connectivity from the C2 software 500, 600 to enable control of the unmanned vehicle. The unmanned vehicle interface kits 510, 610 can have devices, software, and hardware for integrating the C2 software 500, 600 with selected unmanned platforms. An unmanned vehicle common interface 510, 610 can use plug-in interfaces for the capability of controlling current and future unmanned vehicle platforms. The unmanned vehicle interface 510, 610 has an unmanned vehicle native platform controller 565, 665 that can control a common command interface 570, 670, a common information interface 575, 675 and a common physical interface 580, 680. The native platform controller 565, 665 takes information from common command interface 570, 670 and the common information interface 575, 675 and converts into the custom physical interface 580, 680. The common command interface 570, 670 translates the commands from the plan execution 530, 630 in a common command language into a native controller language of the platform. The common information interface 575, 675 collects information and provides products such as video, pictures, audio, and the like, to the feedback manager 535, 635. The custom physical interface 580, 680 can involve the interaction with hardware or mounting, such as determining how to get power or control pan tilt.

Figure 8:
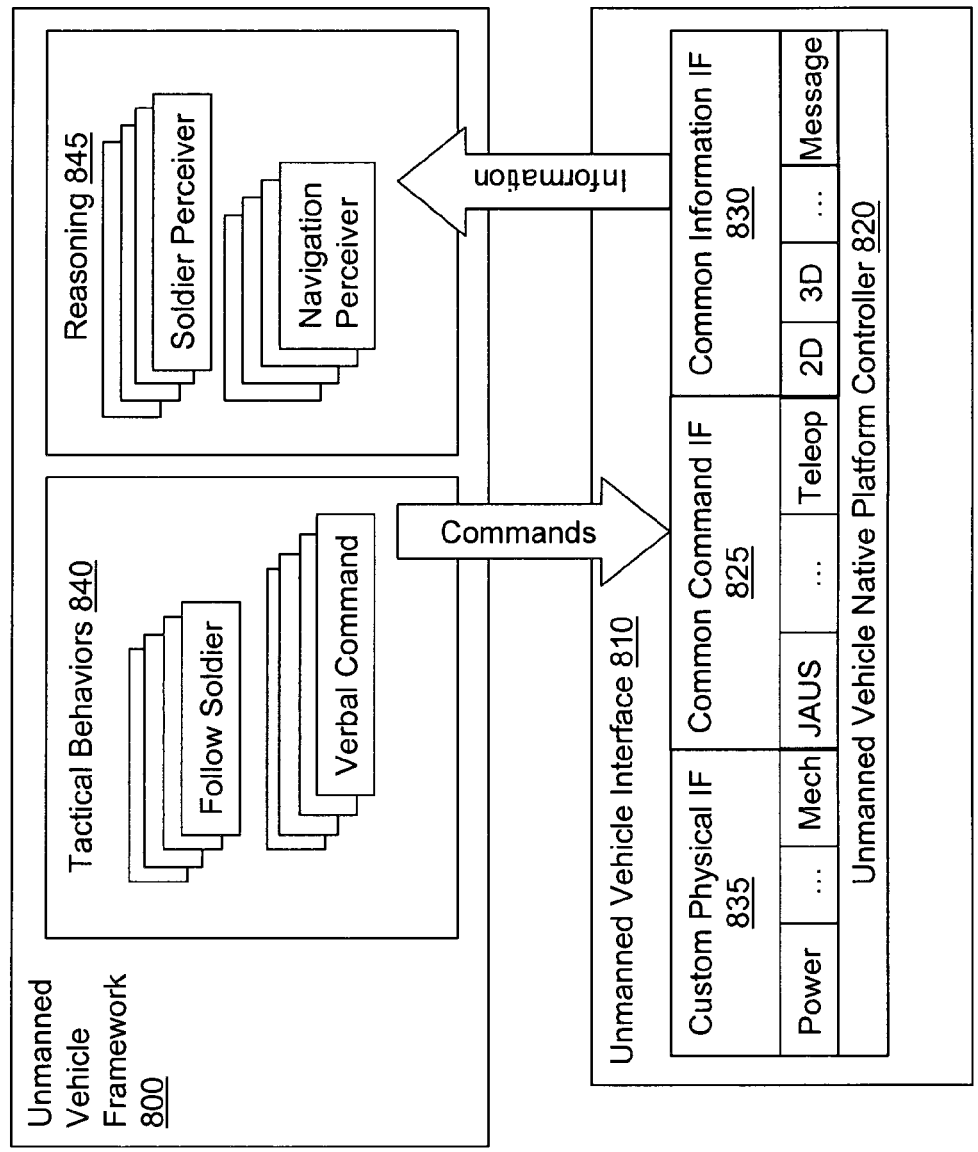
FIG. 8 shows a system architecture according to an embodiment of the present invention.

Referring to FIG. 8, an architecture demonstrating the interface between an unmanned vehicle framework 800 and an unmanned vehicle interface 810 is shown. In the unmanned vehicle interface 810, which can resemble the unmanned vehicle interface 510, 610 in FIGS. 5 and 6, an unmanned vehicle native platform controller 820 can control a common command interface 825, a common information interface 830, and a custom physical interface 835. The common command interface 825 has modules such as a JAUS (Joint Architecture for Unmanned Systems) interface (e.g., to convert a command a send it to the platform), teleoperation interfaces (e.g., determine how to teleoperate and convert for the platform), and/or any well-defined interface, whether or not it is a standard. The common information interface 830 has modules such as a 2D (e.g., send pictures from a soldier or sensor, video frames, or streaming media, or a laser line scanner), 3D (e.g., radar, ladar, laser range information including distance), messages that go back and forth, and the like. The custom physical interface 835 has modules such as power, mechanical connections, network power, radio hookups, pan tilt, additional sensors, and/or other additional physical components. In one example of an interaction between the components of the unmanned vehicle interface 810, if the common command interface 825 and the common information interface 830 require a plug-in for a new device, the custom physical interface 835 may respond by querying whether a new antenna is needed.

The unmanned vehicle interface can convert the system information and control data into native control directives for the base platform. Each protocol can be supported by a plug-in that handles the translation. As a result, this approach can support new platforms and protocols.

The unmanned vehicle framework 800, which can represent software and/or hardware components shown in the TSS and C2 software shown in FIG. 5, can have tactical behaviors 840 (e.g., follow soldier or a verbal command) that are commanded to the common information interface 830. The unmanned vehicle framework can also have a reasoning component 845, which receives information from the custom physical interface 835 to provide to perceivers, such as a soldier perceiver or navigation perceiver.

The architecture in this exemplary configuration can be applicable to any unmanned vehicle or robotic platform. The architecture can be specifically designed to utilize common interfaces that incorporate platform-specific drivers. The software components interact with these interfaces (e.g., physical, command, and information) and the interfaces utilize platform-specific drivers to accomplish their tasks. For example, the software components may instruct the robotic system to "go forward 10 meters." This command is passed to the command interface, which translates it to machine instructions via a driver for JAUS, CanBUS, USB, or other similar platform protocols. JAUS is the joint architecture for unmanned systems. JAUS is formerly known as joint architecture for unmanned ground systems ("JAUGS"). CanBUS is a controller area network multicast-shared serial bus standard.

Figure 9:
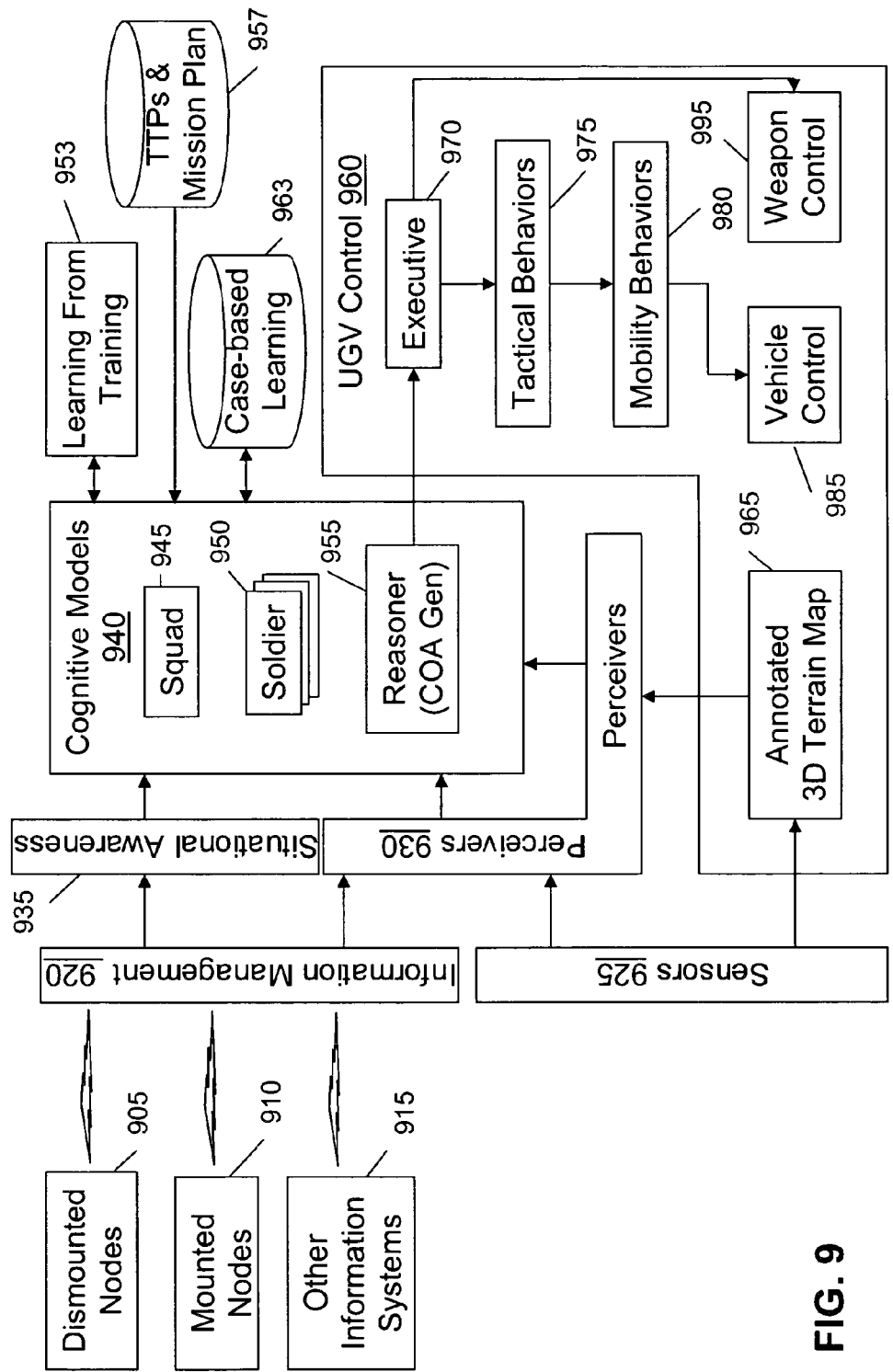
FIG. 9 shows an alternative system architecture according to an embodiment of the present invention.

Referring to FIG. 9, an exemplary architecture is shown for the system. Mounted nodes 910, other information systems 915, and dismounted nodes 905 can communicate with an information management component 920. The mounted nodes 910 can offer information regarding targeting, plans, and detecting enemy soldiers. The other information systems 915 can be used to monitor and analyze current on-the-ground command and control. The dismounted nodes 905 can provide information from soldiers on a battlefield, including the platoon and company level, as well as those soldiers associated with a different unit. The information management 920 can provide both situational awareness 935 as well as information to the perceivers 930. Sensors 925 can also provide information to the perceivers 930. The sensors 925 can provide information to an annotated 3D terrain map 965, which can be used by the perceivers 930 rather than using raw sensor data. The perceivers 930 and the situational awareness 935 can be provided to the cognitive models 940, which also learn from training 953, case based learning 963, and TTPs and mission plans 957. The cognitive models 940 include intent of a squad 945 and soldier 950, as described above with respect to the other architectural configurations. The cognitive model 940 has a reasoner 955 that can generate a plan, which is sent to the unmanned vehicle control 960 for execution. An executive 970 can direct the weapon control or vehicle control 985, through tactical behaviors 975 and mobility behaviors 980.

Figure 10:
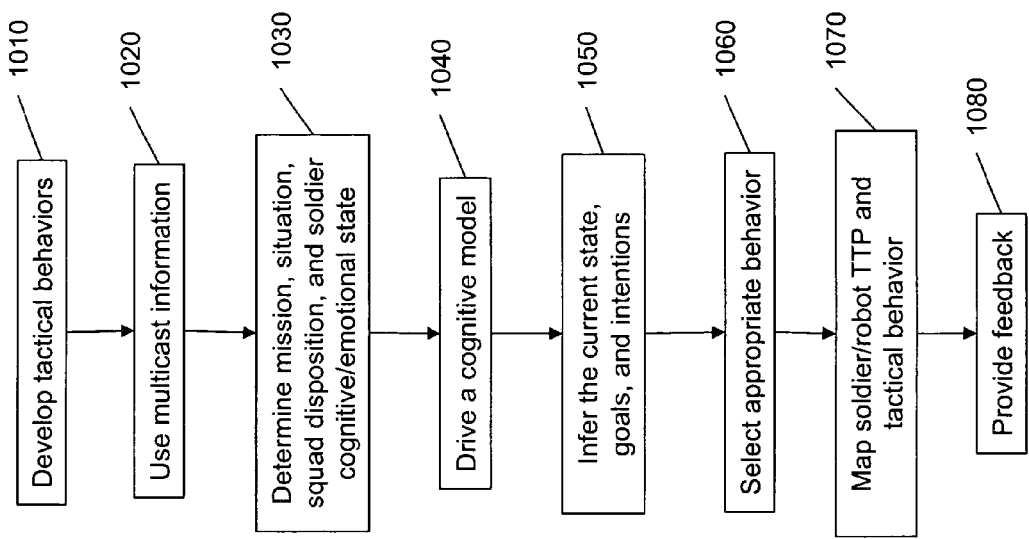
FIG. 10 shows a method of autonomous control according to an embodiment of the present invention.

Referring to FIG. 10, a method of autonomous control can proceed as follows. First tactical behaviors can be developed 1010. Network information can be used to convey information from team members and/or sensors 1020. A determination can be made as to the mission, situation, squad disposition, and soldier cognitive/emotional state 1030. A cognitive model can be driven 1040. The current state, goals, and intentions can be inferred 1050. An appropriate behavior can be selected 1060. Soldier/robot TTP and tactical behavior can be mapped 1070. Optionally, feedback can be provided 1080. This method is not intended to be limited to only these steps or the order thereof.

The system can enable the robotic platform or unmanned vehicle to understand the tactical situation by observing the team members. The TSS can provide the robot with location, weapon state, posture, and physiology information. Each team member can serve as a sensor for detecting the environment and interpreting it for the unmanned vehicle. The C2 software on each unmanned vehicle can collect information from each team member as well as from the robotic platform's sensors. Using cognitive models, the C2 software reasons about how the team members have positioned themselves, how they are moving, their postures, whether they are pointing their weapons, whether the weapons safeties are off, and the state implied by each team members physiology. In view of this information, the system generates an estimate of squad intent, which is used to develop a short-term, simplistic plan known as the playbook action ("PA"). The system executes the PA and monitors the results. As long as the PA remains valid, the unmanned vehicle continues to execute it. If the system changes the estimate of intent or receives direct feedback from a team member, the system can modify or replace the current PA.

The PA generator derives a short-term play for the platform that is appropriate for the situation, understood and expected by the team members, and consistent with the team's training with the platform. The PA generator evaluates the current tactical state provided by the cognitive model to determine which play to call from the playbook. Plays are short-term action plans, customized to fit the current situation. The playbook approach provides control at a high level of abstraction, but leaves the details of execution to the execution control and monitoring layer of the system architecture. In the C2 paradigm, all team members (human and robotic) share the same definition of a play (e.g., a battle drill) and understand the goals and acceptable behaviors for each member.

The playbook is developed based on current training materials and TTPs. The system selects a play on the fly by a team member's command override or by a situation and intent analysis. Playbooks minimize the necessity for human interaction, while maximizing the capability of humans to interact and control the situation for optimal achievement of mission objectives.

Figure 11B:
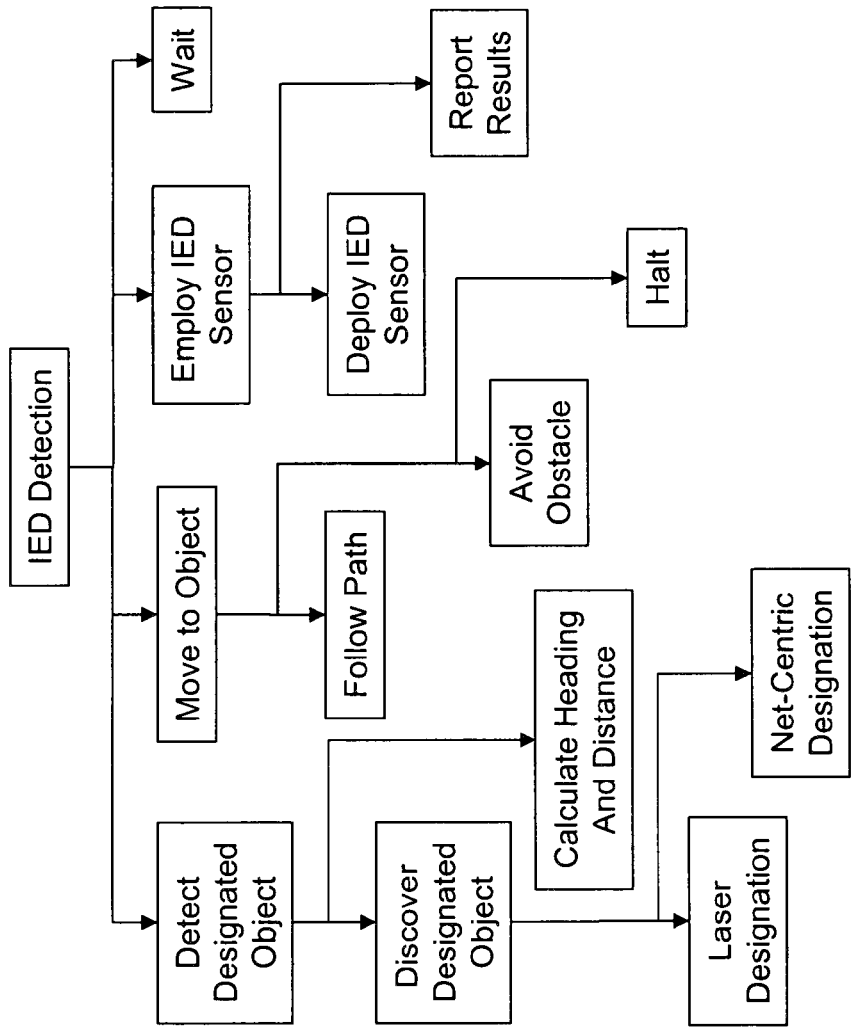
FIGS. 11a and 11b show a playbook and plays for a course of action in the playbook according to an embodiment of the present invention.
Figure 11A:
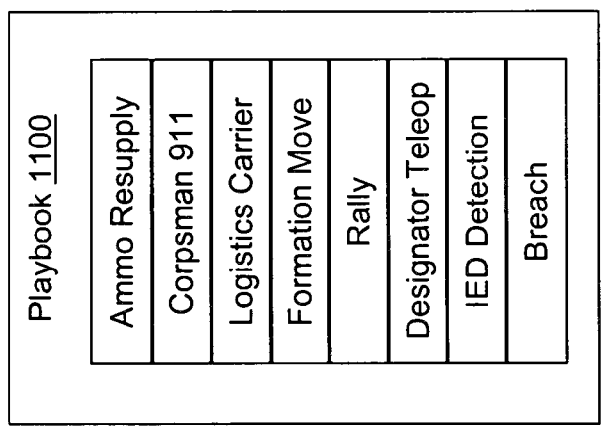

Referring to FIG. 11*a*, an exemplary playbook 1100 is shown. In this playbook 1100, the platform can choose between ammunition resupply, corpsman 911, logistics carrier, formation move, rally, designator teleoperations, IED detection, and breach. In FIG. 11*b*, once IED detection is chosen as the course of action, for example, the PA generator has short plays for the current tactical situation, including, but not limited to, detect designated object, discover designated object, calculate heading and distance, laser designation, net-centric designation, move to object, follow path, avoid obstacle, employ IED sensor, deploy IED sensor, wait, and report results.

The execution control and monitoring layer sequences the PA, monitors the intermediate results, and determines if the play is succeeding, failing, or being overtaken by events. The play executive ensures that the PA created by the PA generator is executable and executed. The play sequencer is the primary executive for the platform. The play sequencer has explicit knowledge about the system behaviors and the capabilities of the underlying platform. The play sequencer can be used to create platform and context specific executable robotic actions that will achieve the objectives of the play. Real-time monitoring detects exceptions in execution performance and exception handling provides repair actions for exceptions identified by action monitoring.

The playbook monitor ("PM") evaluates the status of the current PA, reasoning at the level of abstraction of the original play produced by the PA generator to determine what feedback, if any, to provide to the team member via the feedback manager.

In order to construct a computational cognitive model, the system can use an existing cognitive framework, such as the Sandia Cognitive Framework, or build the cognitive model using languages such as ACT-R or SOAR.

The system can adapt, learn, and train with the team in an effort to avoid obsolescence or being overtaken by events. Learning can be based upon many sources of information. Verbal commands, command overrides, and consent-by-taking-no-action provide feedback to the system on the quality of its understanding and action generation. TTPs, battle drills, x-files, and field manuals offer information on proper actions to take in tactical situations. Additionally, mission-recording and human-in-the-loop after action reviews can provide an environment in which situational understanding and action generation can be assessed and modified.

Training and learning can occur on many levels. Tactical preferences can be minor modifications to the play. Team preferences for certain aspects are not defined in TTP or battle drills. The system can learn to adjust tactical timing (e.g., the time interval between team members crossing the street or a line of sight). The system understands roles, thereby operating at a higher level of abstraction. When a team leader calls plays, a predefined PA is prompted by the PA generator. The cognitive model can learn how to respond to a new situation and how to differentiate the new situation from the known situation (e.g., schema differencing). A team member guides a robot step-by-step through a new process, allowing the PA generator to build a new play. The new play can be associated with a new verbal command, extending the command vocabulary. Behavioral preferences are an extension of play recording. Data can be recorded during training and actual missions to provide adjustments to improve execution and coordination with a given team.

Learning can be test-based on confidence metrics derived from semantic network situational understanding, case-based reasoning (e.g., comparing the current situation with historical cases), learning from training (e.g., parameterization of "playbook" actions, when playbook actions are appropriate, and responsibilities of different squad roles), or reinforcement learning (e.g., feedback from soldiers when inappropriate behavior is produced in the form of real-time verbal feedback or after-action review). The system can also learn from soldier interaction or response to events and objects. The system can learn from a squad-specific approach to tactical situations or soldier-specific physiological and behavioral response to threats. The system stores cases to guide real-time assessment. The system can also collect confirmatory information to validate a situational hypothesis.

Figure 12:
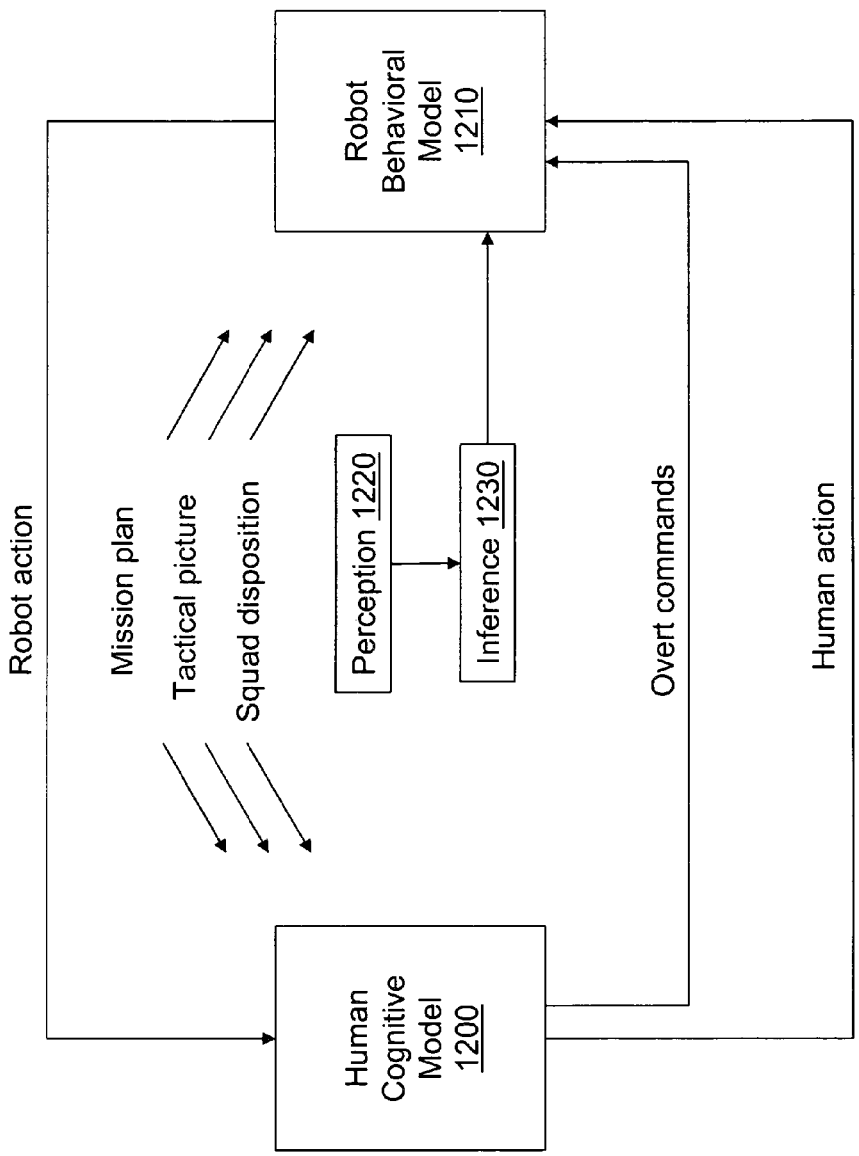
FIG. 12 shows a system of robotic learning and training according to an embodiment of the present invention.

Learning of tactics and appropriate action can be enabled whenever a human gives corrective input to the human. This can be in the form of verbal override commands or "after action" analysis of the robot's performance. The human's corrective input can used to define and differentiate a situation where the new behavior is required and to enable the system to detect the appropriate situational markers (e.g., team positioning, team actions, changes in human physiology) that can be used in the future to trigger the new behavior. Referring to FIG. 12, feedback from both the current robot's behavior and corrections from the human can initiate learning in the robot resulting in modification to the state transition. A robot behavioral model 1210 can utilize inferences from perception 1220, overt commands, or a human's actions to learn a new behavior. The robot's actions and results are sent as feedback to the human cognitive model 1200. Both the soldier and the robot can analyze the situation in view of the mission plan, tactical picture, and squad disposition.

For verbal commands, the system can include voice understanding, a fixed command set, command override, the ability to learn new verbal commands, and gesture commands with an instrumented glove. The command vocabulary can include, for example, point, flank, guard, and evac.

The systems and methods can combine long-wave infrared images from an IR-sensitive camera (e.g., a FLIR A20) with corresponding images from other devices (e.g., two cameras in a stereo configuration, such as a PGR Bumblebee, a color camera, and a LADAR scanner) to detect humans. These sensors are integrated in the net-centric environment.

Each soldier or team member can be outfitted with a PDA, wearable computer, or a computer that is implemented in one of their devices, such as a computer in the scope of the weapon. The information regarding the soldier can be transmitted through a wireless network from the computer to the unmanned vehicle or robotic platform.

Tactical maneuvers can include following a team member, rally to a named point or team member, formation movement, maneuver to a fire position, wall hugging, low observability movement, and stealthy movement. The system is also capable of tactical understanding and role-based behavior, including safe operations with instrumented team members or other personnel, simpler roles such as "guard in place," or more sophisticated roles such as "point man" or "rear guard."

In one example of this configuration, a team moves through a city with unmanned ground vehicles (e.g., a Talon) moving along with them to augment the team's capabilities in remote inspection, improvised explosive device ("IED") detection, and ammunition resupply. The team sees an object and designates it as suspicious. The team verbally commands a Talon to inspect the suspicious object. The Talon employs IED sensors and reports back to the team. As a result, a team member does not have to perform continuous operator control of the Talon and can multitask while the Talon moves to and from the suspicious object. The Talon is put in harm's way, rather than a human. Other benefits can include a reduction in time to achieve mission goals and capabilities of those team members due to an automation of repetitive tasks. Additionally, the unmanned ground vehicles assume risks from the team members, which can increase team member survivability.

In another example of this configuration, the team comes under fire during a routine patrol. In this example, an unmanned ground vehicle (e.g., a Gladiator) is in point position and an unmanned aerial vehicle (e.g., a Dragon Eye) is automatically maintaining position a few blocks in front of the squad. When the team gets excited and point safety-off weapons at a location, the Dragon Eye sweeps back to give an overhead situation awareness of the target area. The Gladiator moves towards the threat, drawing fire and moving its sensors into a better position for detection. The Gladiator monitors the street with its onboard sensor suite, alerting the team to new intruders. In this example, the team members do not have to perform any operator control of the unmanned ground/air vehicles or constantly monitor their progress. Additionally, these unmanned ground/air vehicles can augment the team's capabilities in scouting and reconnaissance without a team member on point, just in case an ambush occurs.

In another example of this configuration, the team is on a movement to contact mission and aim their weapons at a threat. The team members verbally command the Gladiator for cover fire. The Gladiator realizes that the team members are stressed, their weapons are safety-off, and they are firing at a threat. The Gladiator triangulates the threat's location and positions itself to cover fire on command. When a team member is wounded, the Gladiator automatically provides cover for him and the corpsmen. On command from a corpsman, the Gladiator acts as a MEDEVAC when the wounded team member is stabilized. In this example, the unmanned ground vehicle can carry additional ammunition and medical supplies for a resupply, even under fire. The unmanned ground vehicle can even provide additional suppressive fire to enable the team members to maneuver.

In another example, the team members designate a vehicle and verbally command the Talon to inspect it. The Talon autonomously approaches the vehicle and employs onboard sensors, reporting results back to the team. The Gladiator provides cover, ready to fire on command. The Gladiator monitors team weapon status to determine threat status and responds accordingly. The Dragon Eye performs reconnaissance several miles ahead, alerting the team of approaching vehicles. In this example, the team members are provided with a greater standoff from potential threats and are provided with an early warning of approaching threats.

In one example of using this configuration, a soldier walks forward and a robot takes point in front of the soldier providing cover in case of a surprise attack. The soldier switches the safety to "off" on the weapon and assumes a tactical posture. The robot tacks back and forth in a general direction to flush out hidden enemies, maintain a view of the soldier to analyze the body pose and hand signals, position itself to provide cover for the crouching soldier, and retreat if necessary when the soldier starts retreating by providing rear guard and cover for the soldier.

Key events and cooperative behaviors can include, but are not limited to, team movement, formation change, verbal override, providing cover fire, ammunition resupply, and protecting a downed (e.g., injured or wounded) soldier. For team movement, the robot can move appropriately into a formation, including line, wedge, or column. For formation change, the robot can detect change in formation and respond accordingly. For verbal override, the robot can change position from default in response to verbal directive. For providing cover fire, the robot can detect soldier/team pose, elevated physiology, weapon orientation and status (e.g., safety "off" or firing), and estimates location of threat to provide cover fire for the team. For ammunition resupply, the robot can detect soldier ammunition as low and move to resupply the soldier with additional ammunition. For protecting a downed soldier, the robot can detect a wounded soldier through pose and physiological status, maneuvering between the wounded soldier and the estimated threat.

Figure 13A:
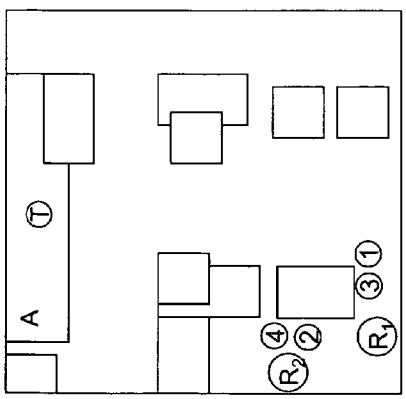
FIGS. 13a to 13h show a team's ingress on an enemy force according to an embodiment of the present invention.
Figure 13B:
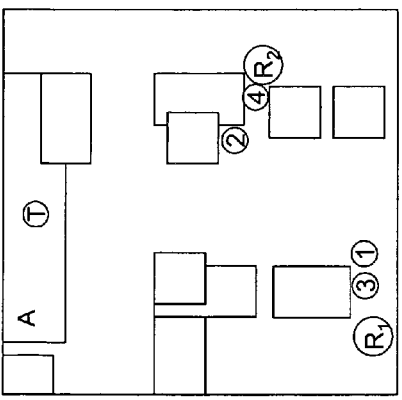
Figure 13C:
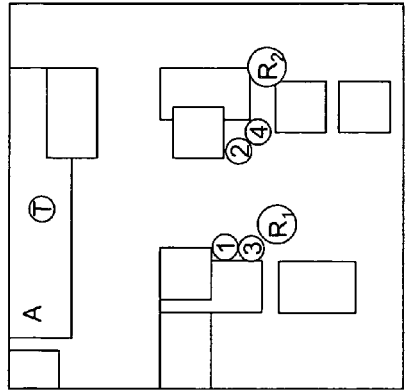
Figure 13D:
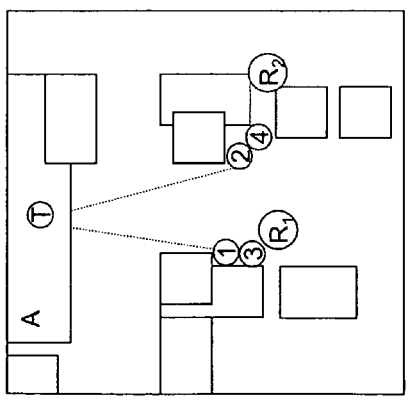
Figure 13E:
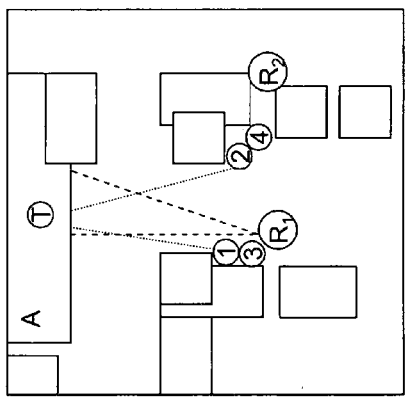
Figure 13F:
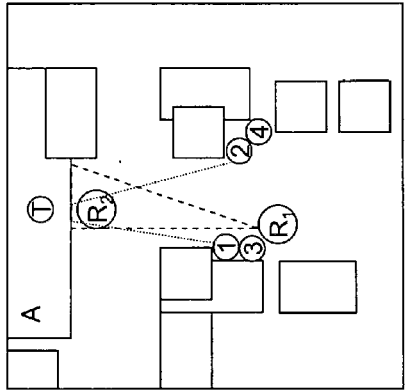
Figure 13H:
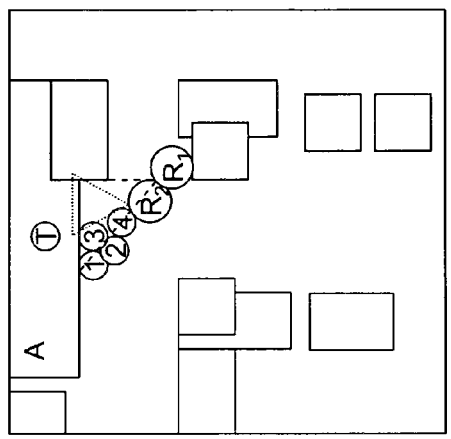
Figure 13G:
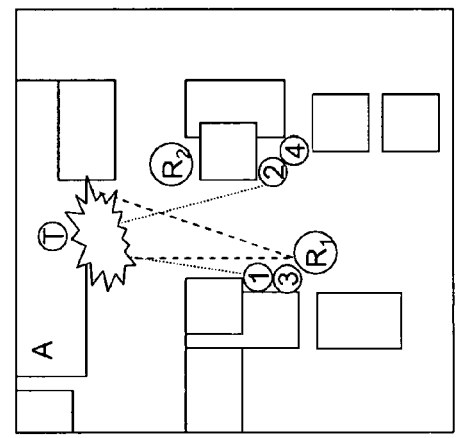

In another example, referring to FIG. 13a, a fire team ingresses an area of building A using a satchel charge to enable an assault on an enemy force T. In FIGS. 13b and 13c, the fire team continues to ingress the area and approaches using bounding overwatch. In FIG. 13d, the soldiers begin firing on the target. In FIG. 13e, robot R1 provides cover fire. In FIG. 13f, robot R2 runs gauntlet with the satchel charge and drops it at a wall of building A. In FIG. 13g, robot R2 moves outside the explosive range and the soldiers detonate the charge. In FIG. 13h, robots R1 and R2 provide cover fire as the soldiers storm the breach.

In yet another example, referring to FIG. 14a, a plurality of soldiers execute a "through the door" TTP to breach a doorway and enter a room having assaulting enemy forces therein. Referring to FIG. 14b, soldier 3 breaches the door. Referring to FIG. 14c, soldier 3 retreats and soldier 1 goes through the door and to the left. Referring to FIG. 14d, soldier 2 goes through the door to the right. Referring to FIG. 14e, soldier 3 goes through the door to the left. Referring to FIG. 14f, soldier 4 does through the door to the right.

In an alternative configuration, robots can assume randomly selected positions or roles in the action. For example, referring to FIG. 14g, robot R1 takes the place of soldier 3 and robot R2 takes the place of soldier 2.

Figure 15A:
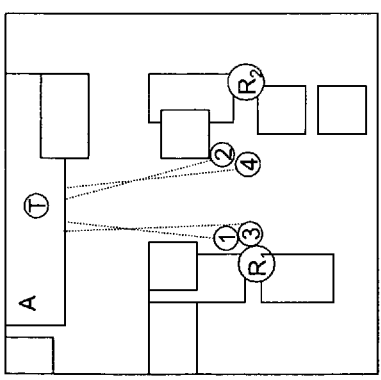
FIGS. 15a to 15f show a team's positioning when a soldier is wounded according to an embodiment of the present invention.
Figure 15B:
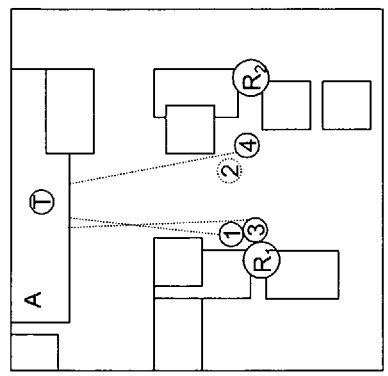
Figure 15C:
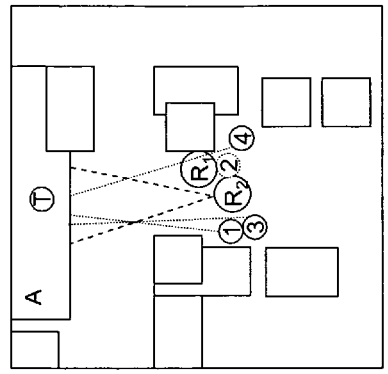
Figure 15D:
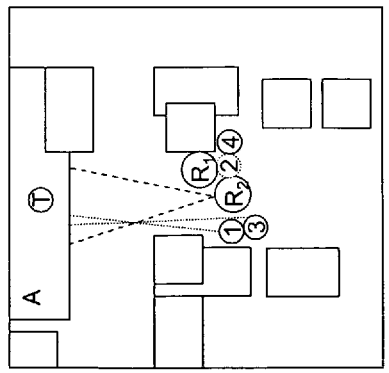
Figure 15E:
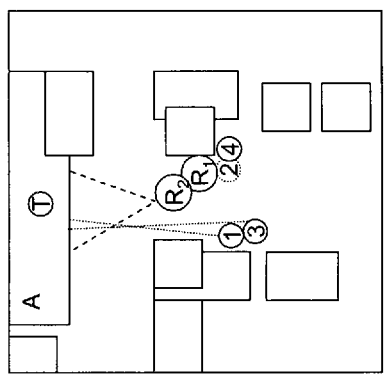
Figure 15F:
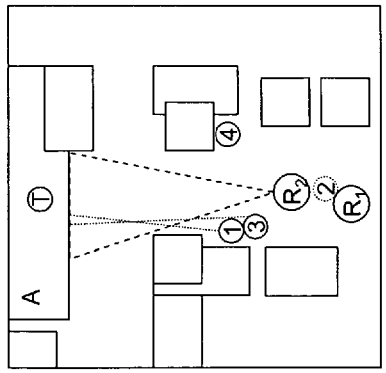

In still yet another example, a soldier is wounded during an assault and robots work as a team to protect and evacuate the downed soldier. Referring to FIG. 15a, a fire team is assaulting a defended enemy position. Robots R1 and R2 provide rear security. Referring to FIG. 15b, soldier 2 is wounded. Soldier 2's impact sensor senses the wound and reports via the network. Referring to FIG. 15c, robot R1 provides physical cover and robot R2 provides wide-area cover fire. Referring to FIG. 15d, soldier 4 assists to attach soldier 2 to robot R1. Referring to FIG. 15e, robot R2 moves to provide physical cover. Referring to FIG. 15f, soldier 4 moves back to cover, robot R1 drags soldier 2 out of the area, and robot R2 provides physical cover and cover fire.

When the system is utilized, a robot can perform cooperative, tactically correct behavior without human interaction or cognitive burden. In a dismounted mode, the robot operates as an integrated and trained member of a team, understands team mission and tactics, needs no human intervention during short-term high-intensity conflict, has situational awareness and understanding by discovery and harvesting the net-centric information streams. In a mounted mode, a robotic "wingman" can automatically support and protect a manned vehicle; can understand machine readable mission plans, situational awareness and understanding, and targeting streams; can provide automated net-centric fire platform; and the automatic tactical behavior reduces the need for robotic controllers.

Referring to FIG. 10, in one configuration, the system is integrated in a small-unit unmanned ground vehicle for high-stress operations, such as military operations on urban terrain ("MOUT") scenarios, without using an OCU. The system will use tactical behaviors; use netcentric information from instrumented sources to determine the mission, situation, squad disposition, and soldier cognitive/emotional state; monitor the soldiers' positions and poses to detect changes in a tactical state; utilize a cognitive model of the soldier and the squad to infer the current state, goals, and intentions; based on the inference, select the appropriate behavior for the unmanned ground vehicle to support the squad in the current situation; map the soldier/robot TTP and tactical behavior into the current situation and terrain; and provide non-computer, non-RF feedback to the soldier from the robot (e.g., pointing at a suspected enemy location). The system can be constantly updated with information from external sources.

The embodiments described above are intended to be exemplary. One skilled in the art recognizes that numerous alternative components and embodiments that may be substituted for the particular examples described herein and still fall within the scope of the invention.

What is claimed is:

1. A method for controlling a robotic platform, the method comprising:
   receiving, from a plurality of team member sensors, team member information;
   receiving, from a team sensor, team information;
   receiving, from an environment sensor, environment information;
   determining a cognitive state model using a software component, of one or more team members based on the received team member information and one or more confidence metrics;
   determining a cognitive state model of the team based on the received team information and one or more confidence metrics; and
   determining, based on the cognitive state models and the environment information, an action for the robotic platform.

2. The method of claim 1, wherein the team member information is selected from the group consisting of position, heart rate, blood pressure, motion and weapon status.

3. The method of claim 1, wherein the environment information is selected from the group consisting of terrain information, obstacle detection information and target information.

4. The method of claim 3, wherein the terrain information includes a terrain map.

5. The method of claim 3, wherein the target information includes target identification and target location information.

6. The method of claim 1, wherein the team information includes one or more of the group consisting of team formation, change of team formation, team tactics, team weapon status and team techniques and procedures.

7. The method of claim 1, wherein the determining of the action is further based on one or more of pre-stored databases of tactics, techniques, and procedures ("TTP").

8. The method of claim 1, wherein the determined action is selected from the group consisting of stopping, unguarded motion, guarded motion, protecting the team and hiding.

9. The method of claim 1, further comprising executing the determined action.

10. The method of claim 9, further comprising receiving feedback based on the executed action.

11. A robotic platform comprising:
   a perceiver for:
      receiving team member information from a plurality of team members within a team;
      receiving team information from the team;
      receiving environment information; and
   a reasoner in communication with the perceiver for:
      building a cognitive state model of one or more of the plurality of team members, based on the received team member information and one or more confidence metrics;
      building a cognitive state model of the team, based on the received team information and one or more confidence metrics; and
      determining, based on the cognitive state models and environment information, an action for the robotic platform.

12. The robotic platform of claim 11, wherein the team member information is selected from the group consisting of position, heart rate, blood pressure, motion and weapon status.

13. The robotic platform of claim 11, wherein the environment information is selected from the group consisting of terrain information, obstacle detection information and target information.

14. The robotic platform of claim 13, wherein the terrain information includes a terrain map.

15. The robotic platform of claim 13, wherein the target information includes target identification and target location information.

16. The robotic platform of claim 11, wherein the team information includes one or more of the group consisting of team formation, change of team formation, team tactics, team weapon status and team techniques and procedures.

17. The robotic platform of claim 11, wherein said determining of the action is further based on one or more of pre-stored databases of tactics, techniques, and procedures ("TTP").

18. The robotic platform of claim 11, wherein the determined action is selected from the group consisting of stopping, unguarded motion, guarded motion, protecting the team and hiding.

19. The robotic platform of claim 11, further comprising executing the determined action.

20. The robotic platform of claim 19, further comprising receiving feedback based on the executed action.

* * * * *